United States Patent
Imanaka

[11] Patent Number: 5,707,290
[45] Date of Patent: Jan. 13, 1998

[54] DAMPER DISC ASSEMBLY

[75] Inventor: Hideyuki Imanaka, Moriguchi, Japan

[73] Assignee: Exedy Corporation, Osaka, Japan

[21] Appl. No.: 650,390

[22] Filed: May 20, 1996

[30] Foreign Application Priority Data

May 26, 1995 [JP] Japan .................................. 7-128004

[51] Int. Cl.$^6$ ...................................................... F16D 13/74
[52] U.S. Cl. .................. 464/9; 192/113.5; 192/213.2; 464/68
[58] Field of Search ...................... 464/66, 65, 64, 464/68, 8, 7, 9; 192/213.2, 203, 205, 113.5; 74/574

[56] References Cited

U.S. PATENT DOCUMENTS

| | | | |
|---|---|---|---|
| Re. 22,635 | 4/1945 | Thelander | 192/205 X |
| 2,221,823 | 11/1940 | Thelander | 192/205 |
| 2,284,349 | 5/1942 | Thelander | 464/7 X |
| 4,006,809 | 2/1977 | Seino et al. | 192/113.5 X |
| 4,816,006 | 3/1989 | Friedmann | 192/205 X |
| 4,904,225 | 2/1990 | Wormer et al. | 464/68 X |
| 4,936,434 | 6/1990 | Clancey | 192/213.2 X |
| 5,146,811 | 9/1992 | Jackel | 464/66 X |
| 5,242,328 | 9/1993 | Friedmann et al. | 464/24 |

FOREIGN PATENT DOCUMENTS

| | | |
|---|---|---|
| 34 47 653 | 7/1985 | Germany . |
| 2153489 | 8/1985 | United Kingdom . |

*Primary Examiner*—Eileen A. Dunn
*Attorney, Agent, or Firm*—Shinjyu Office of Patent Attorney

[57] ABSTRACT

A clutch disc assembly (1) is provided a lubrication member (11) to suppress the wear of parts which contact any of the coil springs (7) disposed within the clutch disc assembly (1). Plates (4) and (5) and a separated flange (3) are configured to rotate relative to each other. Raised portions (4a) and (5a) of the plates (4) and (5) correspond to a window (3c). Each of the large coil springs (7) is confined within the window (3c), the raised portions (4a) and (5a) of the plates (4) and (5) and the separated flange (3) in the circumferential direction. A lubricant-impregnated member (11) is provided in the plates (4) and (5), and is contactable with the large spring coil (7).

16 Claims, 2 Drawing Sheets

DAMPER DISC ASSEMBLY

BACKGROUND OF THE INVENTION

1. Field of the Invention

The present invention relates to a damper disc assembly, and more particularly to a damper disc assembly in which spring members are disposed within a rotary plate receiving portion and are provided with lubrication to reduce wear.

2. Description of the Prior Art

A clutch disc assembly for use in an automotive vehicle is typically provided with an input plate, an output hub having a flange integral with its outer circumferential portion, and coil springs for elastically coupling the input plate to the flange in the circumferential direction. A plurality of cutaways (rectangular window portions) are formed on the output hub. Raised portions extending in the axial direction are formed in the input plate at positions corresponding to the rectangular window portions. The coil springs are disposed in space defined by cutaway portions and the raised portions. The raised portions are used to limit the radially outward movement of the coil springs and to limit the movement of the coil springs in the axial direction.

In the conventional clutch disc assembly, when the input plate and the hub flange are rotated relative to each other, the coil springs repeat compression and expansion in the circumferential direction. In this case, since a centrifugal force caused by the rotation of the clutch disc assembly is applied to the coil springs, the coil springs are urged to move to the outer circumferential portions of the cutaway portions of the flange and the raised portions of the input plate. As a result, the flange and the input plate begin to experience wear due to repeated moving contact, thereby shortening the service life of each member.

SUMMARY OF THE INVENTION

One object of the invention is to provide lubrication in a damper disc assembly for those parts which contact slidable elastic members in order to reduce wear.

In accordance with one aspect of the present invention, a damper disc assembly includes a first rotary plate having a first receiving portion and a second rotary plate disposed rotatably relative to the first rotary plate and having a second receiving portion corresponding to first receiving portion. An elastic member is disposed within the first receiving portion and the second receiving portion for coupling the first rotary plate to the second rotary plate in the circumferential direction. A lubricant-impregnated member is provided adjacent to at least one of the first rotary plate and the second rotary plate and is contactable with the elastic member.

Preferably, the lubricant-impregnated member is disposed radially outwardly from the elastic member.

Preferably, the first rotary plate is defined by two plates, and the lubricant-impregnated member is clamped between the two plates.

Preferably, the lubricant includes at least one material selected from one material tetrafluoroethylene, graphite, and molybdenum disulfite.

Preferably, the lubricant is oil.

Preferably, the elastic member is a coil spring. Preferably, the coil spring is subjected to no initial load so that the coil spring is free rotate about its axis.

Preferably, the damper disc assembly further includes a hub formed with a radially outwardly extending flange, the flange formed with a first cutaway, the first rotary plate being formed with a second cutaway, and a small spring member disposed within the first and second cutaways elastically coupling the hub and the first rotary plate.

Preferably, the first rotary plate is formed from two plates, the two plates formed with radially inwardly protruding portions adjacent to the first receiving portion, the radially inwardly protruding portions extending away from one another to define an arcuate recess, and the lubricant-impregnated member being disposed within the arcuate recess.

In accordance with another aspect of the present invention, the damper disc assembly includes a hub formed with a radially outwardly extending flange, the flange formed with a first cutaway, a first rotary plate formed with a second cutaway and a first receiving portion, and a first spring member disposed within the first and second cutaways elastically coupling the hub and the first rotary plate. The damper disc assembly further includes a second rotary plate disposed concentrically with the first rotary plate and configured to be relatively rotatable to the first rotary plate and having a second receiving portion corresponding to the first receiving portion. A second spring member is disposed within the first receiving portion and the second receiving portion for elastically coupling the first rotary plate to the second rotary plate in the circumferential direction. Further, a lubricant-impregnated member is provided adjacent to the first rotary plate, contactable with the elastic member.

Preferably, the lubricant-impregnated member is disposed radially outwardly from the elastic member.

Preferably, the first rotary plate is includes two plates, and the lubricant-impregnated member is clamped between the two plates.

Preferably, the lubricant is chosen from at least one material selected from one material tetrafluoroethylene, graphite, and molybdenum disulfite.

Preferably, the lubricant is oil.

Preferably, the elastic member is a coil spring.

Preferably, the coil spring is subjected to no initial load within the damper disc assembly so that the coil spring is free rotate about its axis.

Preferably, the first rotary plate includes two plates, the two plates formed with radially inwardly protruding portions adjacent to the first receiving portion, the radially inwardly protruding portions extending away from one another to define an arcuate recess, and the lubricant-impregnated member being disposed within the arcuate recess.

Preferably, the damper disc assembly further includes a friction ring disposed between the second rotary plate and the hub and a conical spring disposed between the friction ring and the second rotary plate for generating friction in response to rotary displacement between the hub and second rotary plate.

In the damper disc assembly according to the present invention, when the torque is applied to the first rotary plate, the torque is transmitted through the elastic member to the second rotary plate. When the first rotary plate and the second rotary plate are rotated relative to each other by the twist vibration, the elastic member is repeatedly compressed and expanded between the two plates in the circumferential direction. Also, since the centrifugal force caused by the rotation of the damper disc assembly is applied to the elastic member, the elastic member is moved radially outwardly and is slidably moved relative to the first receiving portion and the second receiving portion. On the other hand, the elastic member is brought into contact with the lubricant-impregnated member so that the lubricant is fed from the lubricant-impregnated member to the elastic member. As a result, the friction generated between the elastic member and the two receiving portions is small. As a result, the two receiving portions are hardly worn to prolong the service life of each component.

In the damper disc assembly according to the second aspect of the invention, since the lubricant-impregnated member is disposed radially outwardly from the elastic member, the elastic member which has moved radially outwardly due to the centrifugal force is slidably moved along and on the lubricant-impregnated member. Here, it is possible to supply the lubricant to the elastic member with a simple structure.

In the damper disc assembly according to the third aspect of the invention, the lubricant-impregnated member is clamped between the two plates. Here, it is possible to simplify the structure by fixing the lubricant-impregnated member to one of the first rotary plate and the second rotary plate.

In the damper disc assembly according to the fourth aspect of the invention, since the lubricant comprises at least one material which is selected from tetrafluoroethylene, graphite, and molybdenum disulfite, the lubrication is excellent.

In the damper disc assembly according to the fifth aspect of the invention, since the lubricant comprises lubricant oil, the lubrication is excellent.

In the damper disc assembly according to the sixth aspect of the invention, the elastic member comprises a coil spring.

In the damper disc assembly according to the seventh aspect of the invention, the coil spring is subjected to no initial load, the coil spring is likely to be rotated about its own axis. For this reason, the coil spring is slidably moved along and on the lubricant-impregnated member and rotated while being supplied at its parts of the surface with the lubricant, whereby the lubricant is fed to the first and second receiving portions. As a result, the lubrication between the coil spring and the receiving portions of the two plates is further enhanced. As a result, the wear of the plates is suppressed and the service life of the two plate is prolonged.

DESCRIPTION OF THE PREFERRED EMBODIMENTS

Figure 1:
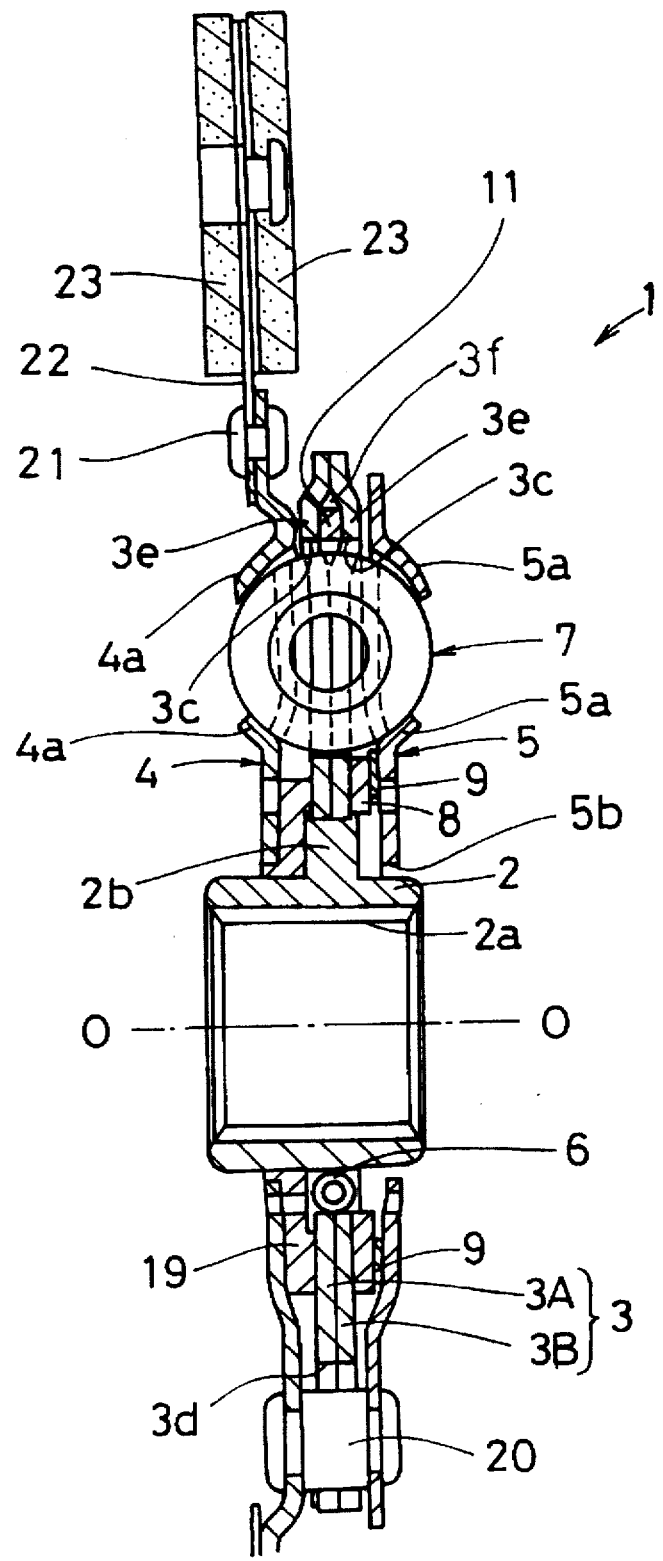
FIG. 1 is a longitudinal sectional view showing a clutch disc assembly in accordance with one embodiment of the present invention.

A clutch disc assembly 1 according to one embodiment of the present invention is shown in FIG. 1. The clutch disc assembly 1 is used to transmit a torque from an engine (not shown) located on the left side of FIG. 1 to a transmission (not shown) located on the right side of FIG. 1. In FIG. 1, line O—O designates a rotary axis of the clutch disc assembly 1. Also, R1 in FIG. 2 indicates a rotational direction of the clutch disc assembly 1.

Figure 2:
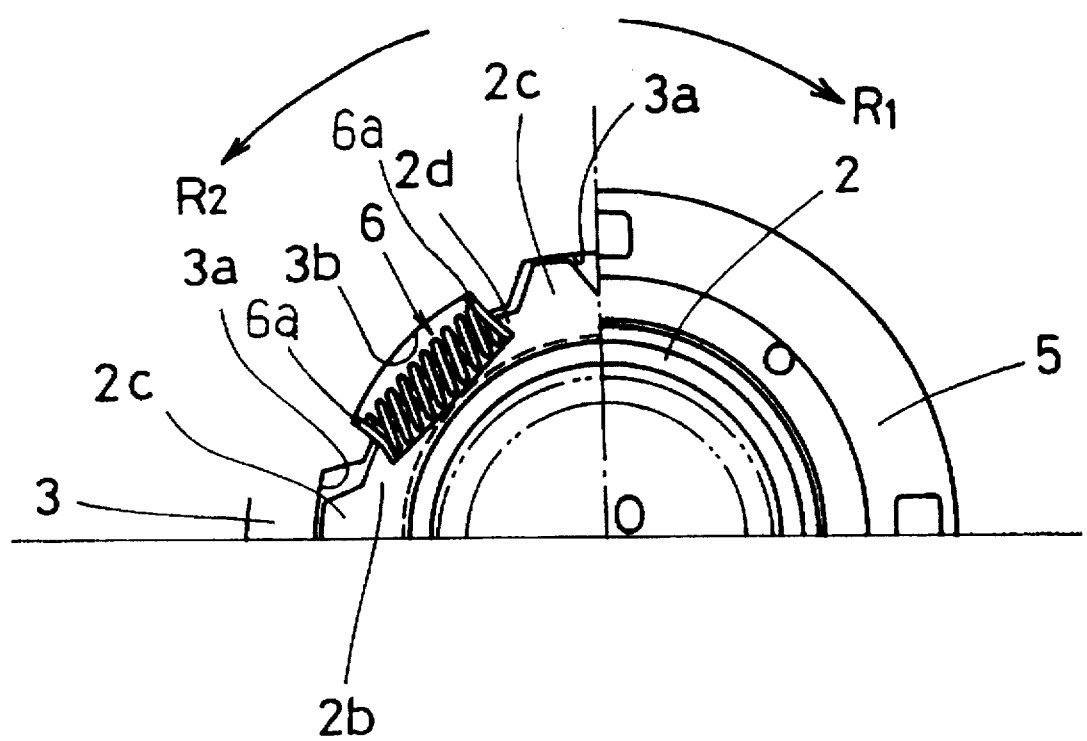
FIG. 2 is an end view of a portion of the clutch disc assembly showing a joint portion between a hub and a separated flange.

A hub 2 which is connectable to a shaft (not shown) of the transmission is disposed at the center of the clutch disc assembly 1. Gear teeth, hereinafter referred to as splines 2a, are formed in a central aperture in a central portion of the hub 2. A small flange portion 2b which extends radially outwardly is formed on the hub 2. A plurality of projections 2c are formed at regular intervals in the circumferential direction on the outer circumference of the flange portion 2b. As shown in FIG. 2, receiving portions 2d are formed by cutting out at two diametrically opposite positions in the flange portion 2b. The receiving portions 2d are configured for receiving small coil springs 6, the small coil springs 6 are described in greater detail below.

A separated flange 3 is disposed on the outer circumference of the projections 2c of the hub. The separated flange 3 is composed of two disc-like plates 3A and 3B that are aligned with each other. Cutaway portions 3a are formed in an inner circumferential side of the two plates 3A and 3B at positions corresponding to the projections 2c of the hub 2. A predetermined space is defined between the cutaway portions 3a and the projections 2c in the circumferential direction, so that the hub 2 and the separated flange 3 may be rotated through a predetermined angle about the line O—O. In a torsion free state shown in FIG. 2, the projections 2c are disposed on the R2 side (in the direction opposite to the rotational direction) of the cutaway portions 3a.

Receiving portions 3b are formed on the inner circumferential side of the separated flange 3 by cutting out at the two positions corresponding to the receiving portions 2d of the hub 2. The small coil springs 6 are disposed within the receiving portions 2d and 3b. Seat members 6a are disposed at each end of each small coil springs 6. The seat member 6a is maintained in contact with portions of the receiving portions 2d and 3b in the circumferential direction by the biasing force of the spring 6.

Radially intermediate portions of the separated flange 3 are formed with a plurality of window holes 3c which extend in the circumferential direction. Arcuate support portions 3e are formed on the radially outward side of the window holes 3c such that the portions 3e of the plates 3A and 3B are spaced apart from each other in the axial direction forming an arcuate recess 3f. Arcuate lubricant-impregnated members 11 are interposed between the two support portions 3e in the arcuate recess 3f. The inner circumferential portions of the lubricant-impregnated members 11 are in alignment with the outer circumferential surfaces of the window holes 3c. The lubricant-impregnated members 11 are made of sintered metal. Tetrafluoroethylene is filled in porosities thereof.

Furthermore, a plurality of cutaway portions 3d are formed at regular intervals in the circumferential direction in the outer circumferential edge of the separated flange 3.

On both sides of the separated flange 3 are disposed a clutch plate 4 and retaining plate 5 which serve as an input plate. The plates 4 and 5 are substantially a pair of disc-like plates that are rotatably engaged with the outer periphery of the hub 2. The plates 4 and 5 are fixed to each other at their outer peripheral portions by contact pins 20. Each pin 20 passes through the cutaway portion 3d of the separated flange 3. A predetermined space is kept in the circumferential direction between the contact pins and the cutaway portions 3d. With this arrangement, the clutch plate 4 and retaining plate 5 and the flange 3 are rotatable relative to each other. However, when the contact pins 20 are brought into contact with the end portions of the cutaway portions 3d, the relative rotation is stopped.

A plurality of cushioning plates 22 are coupled with the outer peripheral edge 4 of the clutch plate 4 by a plurality of rivets 21. Annular frictional facings 23 are fixed to the cushioning plates 22. A flywheel (not shown) on the engine side is disposed on the left side of FIG. 1 with respect to the frictional facings 23. When the frictional facings 23 and the cushioning plates 22 are in pressing contact with the flywheel (not shown), the torque on the engine side is inputed to the clutch disc assembly 1.

The retaining plate 4 and the clutch plate 5 have raised portions 4a and 5a raised axially outwardly at the positions corresponding to the window holes 3c of the separated flange 3. The raised portions 4a and 5a are formed at radially outward and inward positions. A large coil spring 7 is disposed within the raised portions 4a and 5a and each window 3c of the separated flange 3. The large coil spring 7 is larger in diameter than the first coil spring 6 and has a higher rigidity. No initial load is applied to the large coil spring 7 when installed in the window 3c. Therefore, the large coil spring 7 is in a stress free state when there is no torsional stress on the clutch disc assembly 1.

A frictional washer 8 and a conical spring 9 are interposed between the inner circumferential portion of the retaining plate 5 and the inner circumferential portion of the separated flange 3. The washer 8 is engaged with the retaining plate 5 in a one-piece manner which can rotate integrally. The conical spring 9 is retained at its outer circumferential edge to the retaining plate 5 and urges the frictional washer 8 to the inner circumferential side face of the separated flange 3 with its inner circumferential edge.

A second frictional washer 19 is engaged with the inner circumferential portion of the clutch plate 4 to be not rotatable relative each other. The second frictional washer 19 is in contact with the inner circumferential side face of the separated flange 3 and the flange portion 2b and the projections 2c of the hub 2.

The operation of the clutch disc assembly 1 will now be described.

During the rotation of the clutch disc assembly 1, the large coil spring 7 is moved radially outwardly by the centrifugal force caused by the rotation and is slidably moved along the outer circumferential portion of the window hole 3c of the separated flange 3 and the raised portions 4a and 5a on the outer circumferential side of the plates 4 and 5. Furthermore, the large coil spring 7 is slidably moved along the lubricant-impregnated member 11. For this reason, tetrafluoroethylene migrates from the lubricant-impregnated member 11 to the surface of the large coil spring 7. The lubricant is adhered to the surface. Furthermore, the tetrafluoroethylene migrates from the large coil spring 7 to the outer circumferential edge of the window hole 3c and the inner surfaces of the raised portions 4a and 5a. Then, it is adhered thereto. As a result, the lubrication is enhanced between the large coil spring 7 and the window hole 3c and the raised portions 4a and 5a to reduce the wear. Namely, the wear of each component may be reduced. In particular, since the initial load is not applied to the large coil spring 7, the latter may readily be rotated about its axis within the raised portions 4a and 5a. As a result, a large amount of the tetrafluoroethylene fed to the large coil spring 7 is applied to the window hole 3c and the raised portions 4a and 5a.

In this arrangement, since the lubricant-impregnated member 11 is disposed radially outwardly from the large coil spring 7, it is possible to bring the two component into contact within a simple structure. Also, since the lubricant-impregnated member 11 is interposed and fixed between the plates 4 and 5, the structure for fastening the lubricant-impregnated member 11 may be simplified.

When the frictional facings 23 are pushed against the flywheel (not shown) on the engine side, the torque of the flywheel on the engine side is inputed into the plates 4 and 5 through the frictional facings 23 and the cushioning plates 22. This torque is transmitted to the hub 2 through the large coil spring 7, the separated flange 3 and the small spring 6 and is further outputed to the shaft (not shown) on the transmission side.

When a small twist vibration is transmitted from the flywheel on the engine side to the clutch disc assembly 1 producing a small angular displacement, a relative rotation is generated between the plates 4 and 5 and the separated flange 3 and the hub 2. At this time, the small coil spring 6 is repeatedly compressed and expanded in the circumferential direction. In this case, the twist vibration of the small angular displacement is attenuated by the characteristics of the low rigidity and the low friction. In this case, since the friction is hardly generated between the large coil spring 7 and the plates 4 and 5 as described above, the characteristics of low friction are stabilized.

When a relatively large twist vibration which produces a large angular displacement is transmitted to the clutch disc assembly 1, the separated flange 3 and the hub 2 are rotated together, a relative rotation is generated between these components and the plates 4 and 5. At this time, the large coil spring 7 is repeatedly compressed and expanded in the circumferential direction, so that the first frictional washer 8 is slidably moved along the separated flange 3 to generate a large frictional force. Due to the above-described high rigidity/large friction characteristics, the twist vibration of large angular displacement may be effectively attenuated.

When the large coil spring 7 is repeatedly compressed and expanded in the circumferential direction, the centrifugal force caused by the rotation is applied thereto, so that the large spring coil 7 is moved radially outwardly. Then, the large coil spring 7 is slidably moved along the outer circumferential surface of the window 3c and the raised portions 4a and 5a on the outer circumferential side. However, as described above, the friction produced is small between the large coil spring 7 and the plates 4 and 5 due to the lubrication from the lubricant-impregnated member 11 and hence wear between the various sliding parts is reduced. For this reason, the service life of the separated flange 3 and the plates 4 and 5 may be prolonged.

<Modification>

Other solid lubricants such as graphite or molybdenum disulfide may be used instead of the above-described lubricant. These solid lubricants may be used in the mixture of oil or grease. Also, ordinary liquid lubricants such as oil or grease may be solely used.

It is also possible to use other porous material such as grown cast iron or synthetic resin as the lubricant-impregnated member.

In the damper disc assembly according to the present invention, it is possible to feed the lubricant from the lubricant-impregnated member to the elastic member by bringing the elastic member into contact with the lubricant-impregnated member. As a result, the friction between the elastic member and the two receiving portions may be reduced. As a result, the two receiving portions not so easily worn. The service life of each member may be prolonged.

Since the lubricant-impregnated member is disposed radially outwardly from the elastic member, the centrifugal force of the rotation causes the elastic member moved radially outwardly to slidably move the lubricant-impregnated member. Here, it is possible to supply the lubricant to the elastic member with a simple structure.

Since the lubricant-impregnated member is clamped between two plates, the lubricant-impregnated member may be simply fixed to either first rotary plate or second rotary plate.

Since no initial load is applied to the coil spring, the coil spring itself is likely to rotate about its own axis. For this reason, the coil spring is slidably moved along and on the lubricant-impregnated member and rotated while being partially subjected to the lubricant on its surface to thereby feed the lubricant to the first receiving portion and the second receiving portion. As a result, the lubrication is further enhanced between the coil spring and the receiving portions for the two plates.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A damper disc assembly comprising:

a first rotary plate having a first receiving portion;

a second rotary plate disposed rotatably relative to said first rotary plate and having a second receiving portion corresponding to said first receiving portion;

an elastic member disposed within said first receiving portion and said second receiving portion for coupling the first rotary plate to said second rotary plate in the circumferential direction; and a lubricant-impregnated member provided adjacent to at least one of said first rotary plate and said second rotary plate and contactable with said elastic member;

wherein said first rotary plate comprises two plates, and said lubricant-impregnated member is clamped between said two plates.

2. The damper disc assembly according to claim 1, wherein said lubricant-impregnated member is disposed radially outwardly from said elastic member.

3. The damper disc assembly according to claim 1, wherein the lubricant comprises one material selected from the group consisting of tetrafluoroethylene, graphite, and molybdenum disulfite.

4. The damper disc assembly according to claim 1, wherein the lubricant comprises lubricant oil.

5. The damper disc assembly according to claim 1, wherein said elastic member comprises a coil spring.

6. The damper disc assembly according to claim 5, wherein said coil spring is subjected to no initial load so that said coil spring is free rotate about an axis defined within said coil spring in a stress free state.

7. The damper disc assembly according to claim 1 further comprising:

a hub formed with a radially outwardly extending flange, said flange formed with a first cutaway;

said first rotary plate being formed with a second cutaway; and a small spring member disposed within said first and second cutaways elastically coupling said hub and said first rotary plate.

8. The damper disc assembly according to claim 1, wherein said two plates are formed with radially inwardly protruding portions adjacent to said first receiving portion, said radially inwardly protruding portions extending away from one another to define an arcuate recess, and said lubricant-impregnated member being disposed within said arcuate recess.

9. A damper disc assembly comprising:

a hub formed with a radially outwardly extending flange, said flange formed with a first cutaway;

a first rotary plate formed with a second cutaway and a first receiving portion;

a first spring member disposed within said first and second cutaways elastically coupling said hub and said first rotary plate;

a second rotary plate disposed concentrically with said first rotary plate and configured to be relatively rotatable to said first rotary plate and having a second receiving portion corresponding to said first receiving portion;

a second spring member disposed within said first receiving portion and said second receiving portion for elastically coupling the first rotary plate to said second rotary plate in the circumferential direction; and a lubricant-impregnated member provided adjacent to said first rotary plate, contactable with said elastic member;

wherein said first rotary plate comprises two plates, and said lubricant-impregnated member is clamped between said two plates.

10. The damper disc assembly according to claim 9, wherein said lubricant-impregnated member is disposed radially outwardly from said elastic member.

11. The damper disc assembly according to claim 9, wherein the lubricant comprises one material selected from the group consisting of tetrafluoroethylene, graphite, and molybdenum disulfite.

12. The damper disc assembly according to claim 9, wherein the lubricant comprises lubricant oil.

13. The damper disc assembly according to claim 9, wherein said elastic member comprises a coil spring.

14. The damper disc assembly according to claim 13, wherein said coil spring is subjected to no initial load so that said coil spring is free rotate about an axis defined by said coil spring in a stress free state.

15. The damper disc assembly according to claim 9, wherein said two plates formed with radially inwardly protruding portions adjacent to said first receiving portion, said radially inwardly protruding portions extending away from one another to define an arcuate recess, and said lubricant-impregnated member being disposed within said arcuate recess.

16. The damper disc assembly according to claim 9, further comprising a friction ring disposed between said second rotary plate and said hub and a conical spring disposed between said friction ring and said second rotary plate for generating friction in response to rotary displacement between said hub and second rotary plate.

* * * * *